United States Patent
Diehl et al.

[15] 3,700,674
[45] Oct. 24, 1972

[54] 4-ALKYLAMINO-3-NITROQUINOLINES

[72] Inventors: Robert Eugene Diehl, Trenton; Richard Joseph Magee, Princeton, both of N.J.

[73] Assignee: American Cyanamid Company, Stamford, Conn.

[22] Filed: April 30, 1969

[21] Appl. No.: 820,649

[52] U.S. Cl. ............... 260/288 R, 71/94, 260/283 S, 260/283 SY, 260/283 R
[51] Int. Cl. ............................................. C07d 33/52
[58] Field of Search ............................... 260/288

[56] References Cited

UNITED STATES PATENTS

| | | | |
|---|---|---|---|
| 2,066,730 | 1/1937 | Jensch | 260/288 X |
| 3,113,072 | 12/1963 | Goodhue et al. | 260/288 X |
| 3,252,858 | 5/1966 | Goodhue | 260/283 X |
| 2,661,276 | 12/1953 | Schlesinger | 260/283 X |
| 2,665,203 | 1/1954 | Emerson | 260/283 X |
| 3,470,172 | 9/1969 | Kaufman | 260/295 X |

OTHER PUBLICATIONS

Surrey et al., Jour. Am. Chem. Soc. Vol. 73, p 2413–2416 (1951)
Jain et al. Chem. Abstr. Vol. 68 Col. 114396t (1968)

*Primary Examiner*—Donald G. Daus
*Attorney*—Lawrence W. Flynn

[57] ABSTRACT

The herbicidal compounds have the formula:

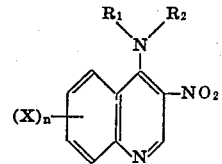

wherein:
$R_1$ and $R_2$ are each hydrogen, lower alkyl, or (lower alkylthio)lower alkyl except that $R_1$ and $R_2$ may not both be hydrogen,
X is hydrogen, halo, or trifluoromethyl.

5 Claims, No Drawings

4-ALKYLAMINO-3-NITROQUINOLINES

SUMMARY OF THE INVENTION

This invention relates to novel herbicidal 4-alkylamino-3-nitroquinolines represented by the formula:

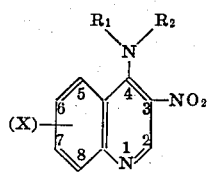

wherein:

$R_1$ and $R_2$, are each selected from the group consisting of hydrogen, lower alkyl, and (lower alkylthio)lower alkyl provided that when either $R_1$ or $R_2$ is hydrogen, the other must be lower alkyl or (lower alkylthio) lower alkyl, X is selected from the group consisting of hydrogen halo, and trifluoromethyl.

This invention also relates to the acid salts of said compounds and in particular to the strong mineral acid salts thereof such as, for example, those of hydrochloric and hydrobromic acid.

This invention further relates to the use of said compounds and their acid salts as pre-emergence and post emergence herbicides.

The term "lower alkyl" when used alone means straight and branched saturated hydrocarbon chains containing from one to five carbon atoms. Illustrative members are methyl, ethyl, n-propyl, n-pentyl, n-butyl, isopropyl, 2-butyl, 3-butyl, 2-pentyl, 3-pentyl, and such.

The term "lower alkyl" when used in conjunction with thio radicals such as (lower alkylthio)lower alkyl radicals means only saturated hydrocarbon chains containing one or two carbon atoms such as methylthio) methyl, (methylthio) ethyl, (ethylthio) methyl, and (ethylthio) ethyl.

The term "halo" means chloro, bromo, iodo, and fluoro.

The following compounds are illustrative of the compounds of this invention. These compounds are named in accordance with the numbering of the quinoline ring given in the preceding formula:

4-methylamino-3-nitroquinoline
3-ethylamino-3-nitroquinoline
4-n-propylamino-3-nitroquinoline
4-n-butylamino-3-nitroquinoline
4-n-pentylamino-3-nitroquinoline
4-(i-propyl)amino-3-nitroquinoline
4-(2-butyl)amino-3-nitroquinoline
4-dimethylamino-3-nitroquinoline
4-diethylamino-3-nitroquinoline
4-dipropylamino-3-nitroquinoline
4-di(i-propyl)amino-3-nitroquinoline
4-di(n-butyl)amino-3-nitroquinoline
4-di(n-pentyl)amino-3-nitroquinoline
4-di(2-butyl)amino-3-nitroquinoline
4-methyl(ethyl)amino-3-nitroquinoline
4-methyl(n-propyl)amino-3-nitroquinoline
4-ethyl(n-butyl)amino-3-nitroquinoline
4-n-butyl(i-propyl)amino-3-nitroquinoline
4-n-pentyl(2-butyl)amino-3-nitroquinoline
4-n-propyl(ethyl)amino-3-nitroquinoline
6,7,8-trifluoro-4-methylamino-3-nitroquinoline
6,7,8-trichloro-4-n-propylamino-3-nitroquinoline
6,7,8-tri(trifluoromethyl)-4-n-butylamino-3-nitroquinoline
6,7,8-triiodo-4-n-pentylamino-3-nitroquinoline
5,6,7-trichloro-4-(i-propyl)amino-3-nitroquinoline
5,6,7-tribromo-4-(2-butyl)amino-3-nitroquinoline
5,7,8-trichloro-4-dimethylamino-3-nitroquinoline
5,7,8-tribromo-4-dimethylamino-3-nitroquinoline
8-chloro-7-bromo-6-fluoro-4-dipropylamino-3-nitroquinoline
,78-dichloro-6-iodo-4-di(i-propyl)amino-3-nitroquinoline
6,7-dibromo-8-chloro-4-di(n-butyl)amino-3-nitroquinoline
5,6-dichloro-7-bromo-4-di(n-pentyl)amino-3-nitroquinoline
5,8-dichloro-4-di(2-butyl)amino-3-nitroquinoline
6,7-dichloro-4-methyl(ethyl)amino-3-nitroquinoline
5,6-dichloro-4-methyl(n-propyl)amino-3-nitroquinoline
7,8-dibromo-4-ethyl(n-butyl)amino-3-nitroquinoline
5,6-diiodo-4-n-butyl(i-propyl)amino-3-nitroquinoline
6,7-difluoro-4-n-pentyl(2-butyl)amino-3-nitroquinoline
8-chloro-4-n-propyl(ethyl)amino-3-nitroquinoline
7-trifluoromethyl-4-methylamino-3-nitroquinoline
6-iodo-4-n-propylamino-3-nitroquinoline
5-fluoro-4-n-butylamino-3-nitroquinoline
6-chloro-4-n-pentylamino-3-nitroquinoline
8-nitro-4-(i-propyl)amino-3-nitroquinoline
7-nitro-4-(2-butyl)amino-3-nitroquinoline
6-nitro-4-dimethylamino-3-nitroquinoline
5-nitro-4-diethylamino-3-nitroquinoline
8-trifluoromethyl-7-chloro-4-dipropylamino-3-nitroquinoline
8-bromo-6-nitro-4-di(i-propyl)amino-3-nitroquinoline
7,8-dichloro-5-nitro-4-di(n-pentyl)amino-3-nitroquinoline
6,7-dinitro-8-chloro-4-methyl(ethyl)amino-3-nitroquinoline
6,7,8-trinitro-4-ethyl(n-butyl)amino-3-nitroquinoline
5,6,7-trinitro-4-n-butyl(i-propyl)amino-3-nitroquinoline
6,7-dinitro-4-n-pentyl(2-butyl)amino-3-nitroquinoline
5,6-dinitro-4-n-propyl(ethyl)amino-3-nitroquinoline

PROCESS OF PREPARATION

The compounds of this invention are conveniently prepared by reacting the appropriately substituted 4-chloro (or bromo)-3-nitroquinoline with the appropriate alkyl amine preferably in a suitable solvent in accordance with the reaction shown below:

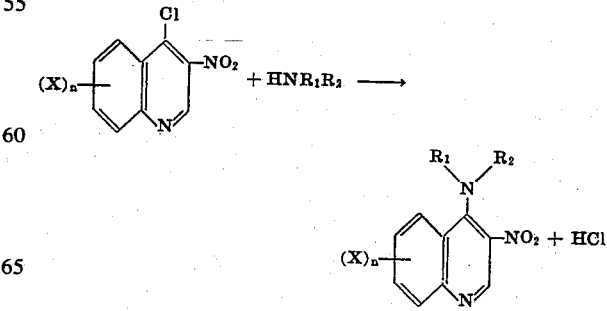

wherein $R_1$, $R_2$, X, and $n$ are as previously defined.

The reaction is preferably run at solvent reflux temperatures which ordinarily range from 60°–120° C. at atmospheric pressure. Suitable solvents include aromatics such as toluene, and benzene, chlorinated hydrocarbons such as chloroform, carbon tetrachloride, dipolar aprotic solvents such as dimethylsulfoxide and dimethylformamide, and such. It is desirable to use an excess of the amine, usually at least about 2 moles of amine per mole of 3-nitroquinoline compound. The excess amine forms an acid salt which precipitates from the reaction mixture thereby aiding purification of the desired product. After the precipitated acid salts are separated from the reaction mixture, solvent is removed to yield a crude product which can be subsequently purified by recrystallization in acetone or other suitable solvents. Of course, if the acid salt of an inventive compound is desired, it is a simple matter to merely react the product with the desired acid in a manner which is well known.

STARTING MATERIALS

The vast majority of the reactant amines are readily available on a commercial basis. Techniques for preparing the other amines required are either well known or obvious to those skilled in the art so as to not require repeating herein.

Reactant 4-chloro-3-nitroquinolines of the formula:

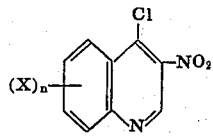

wherein X is halo, nitro or trifluoro(lower)alkyl and $n$ is 0 to 3 are conveniently prepared by a variety of methods depending on such considerations as the availability of the starting material and electronic requirements of the reaction.

Thus, various appropriately substituted 4-chloro-3-nitroquinolines can be prepared from commercially available anthranilic acids in accordance with the teachings of Bachman et al. J.A.C.S. 69 pages 365–370 (1947), said publication incorporated herein by reference.

Alternatively, the desired reactants are conveniently prepared by the decarboxylation of commercially available compounds of the formula:

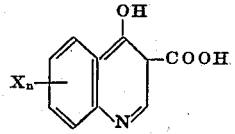

where X and $n$ are as defined above, in accordance with the teaching in J.A.C.S. 69 page 371, said publication incorporated herein by reference. The decarboxylated product is then nitrated in a conventional manner to insert a nitro group into the number 3 position of the quinoline ring. The nitrated quinoline is then treated in accordance with the process of Bachman et al., cited above, to yield the desired 3-nitro-4-chloroquinoline reactant.

The desired reactant can also be prepared by reacting ethyl oxalacetate and an aromatic amine as described in U.S. Pat. No. 2,555,943 to obtain a 2-carboethoxy derivative of the formula:

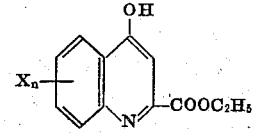

wherein X and $n$ are as defined above. This compound is then hydrolyzed and decarboxylated as described in said patent. The product is then treated with nitric acid and finally converted to the 4-chloro derivative by the process of Bachman et al., cited above.

UTILITY

The compounds of this invention exhibit pre-emergence herbicidal activity towards a variety of broad and narrow leaf plant species. Pre-emergence control is particularly effective as amply demonstrated by the data of Example 14 hereinbelow. It should be noted that the pre-emergence herbicidal activity of these compounds is highly selective insofar as they are effective against a broad range of undesirable weeds which grow among crops while simultaneously having no discernible herbicidal effect upon such useful economic crops as corn, cotton, radish, sugar beets, soybeans, and wheat.

Certain selected compounds of this invention exhibit post emergence herbicidal activity towards a variety of broad and narrow leaf plant species as amply demonstrated by the data of Example 15. While all of the inventive compounds exhibit pre-emergence herbicidal activity, only those compounds where $n$ is zero and $R_1$ and $R_2$ are each lower alkyl or (lower alkylthio) lower alkyl appear to exhibit any significant post emergence herbicidal activity. Post emergence control is also highly selective in that crops such as tomatoes and wheat are left virtually unharmed while the harmful weeds and grasses which grow among such crops are effectively destroyed.

Application of the compounds of the invention for purposes of herbicidal control can be accomplished employing both conventional type formulation and equipment. The compounds may, for instance, be formulated as wettable powders, dusts, dust concentrates, emulsifiable concentrates and the like which are amenable to application with conventional spraying or dusting apparatus.

Wettable powder formulations are generally prepared by admixing from about 25 percent to about 95 percent, by weight, of active ingredient with finely ground clay, such as kaolin or attapulgite, either with or without a surface active agent, emulsifier or spreader-sticker. The latter is then dispersed in water for spray application.

Dusts and dust concentrates are similarly prepared using from about 5 percent to about 95 percent of active ingredient and from about 95 percent to about 5 percent of finely divided inert ingredients. These dusts are generally applied as such, or they may be further diluted with finely ground inert solids and then applied with conventional dusting apparatus.

Emulsifiable concentrates may be prepared by dissolving or dispersing the active ingredient in organic solvent, with or without emulsifying agents, surfactants or the like. Such formulations are then diluted with either water or an appropriate organic diluent prior to application.

The following examples are provided to further illustrate the invention.

EXAMPLE 1

Preparation of 4-di-n-propylamino-3-nitroquinoline

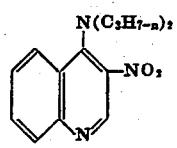

The title compound is prepared by refluxing a sample of 4-chloro-3-nitroquinoline (4.16 g., 0.02 mole) and di-n-propylamine (4.05 g., 0.04 mole) in 40 ml. of toluene for 2 hours. The mixture is then filtered to remove the insoluble hydrochloride salts. The filtrate is concentrated, in vacuo, to yield 4.5 g. (83 percent) of a dark brown oil which gradually crystallizes. After three recrystallizations from acetone, the yellow-orange solid has a melting point of 63°–64° C) Calculated for $C_{15}H_{19}N_3O_2$: C, 65.90; H, 7.00; N, 15.37. Found: C, 66.12 H, 6.93; N, 15.09.

EXAMPLES 2 TO 11

A variety of other inventive compounds were prepared substantially as described in Example 1 except that the appropriate 4-chloro-3-nitroquinoline and amine reactants were selected. These compounds and certain of their properties are shown below in Table I.

mixture is heated for 2 to 4 hours at 80°–90° C. and poured into 500 ml. of ice-water. The precipitated solid is filtered and washed well with water. The sample is recrystallized from dimethylformamide-water to give 5,8-dichloro-3,6-dinitro-4-hydroxyquinoline. The product is then converted to 4,5,8-trichloro-3,6-dinitroquinoline following the method of Bachman et al. J.A.C.S. 69, pages 365–370 (1947).

The desired product, 5,8-dichloro-3,6-dinitro-4-di-n-propylaminoquinoline, is then prepared following substantially the same procedure as in Example 1 except that the 4-chloro-3-nitroquinoline is replaced by 4,5,8-trichloro-3,6-dinitroquinoline.

EXAMPLE 13

Preparation of 5,8-dibromo-3,6-dinitro-4-di-n-propylaminoquinoline

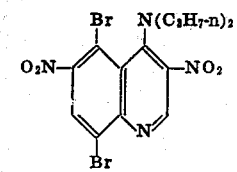

TABLE I

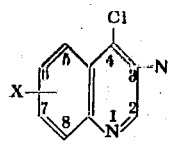 + $R_1R_2NH$ ⟶ 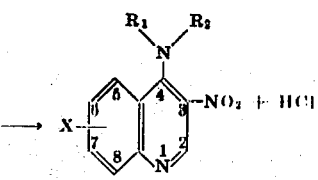 + HCl

| Example number | $R_1$ | $R_2$ | $R_3$ | $X^a$ | Melting point (° C.) | (b) | C | H | N | S | Cl | F |
|---|---|---|---|---|---|---|---|---|---|---|---|---|
| 2 | H | CH(CH$_3$)$_2$ | H | H | 98 | c | 65.90 | 7.00 | 15.37 | | | |
| | | | | | | f | 66.12 | 6.93 | 15.09 | | | |
| 3 | C$_2$H$_5$ | n-C$_4$H$_9$ | H | H | 72–73 | c | 65.91 | 7.00 | 15.37 | | | |
| | | | | | | f | 65.63 | 7.09 | 15.25 | | | |
| 4 | n-C$_3$H$_7$ | n-C$_3$H$_7$ | H | Cl(6) | 93–94 | c | 58.53 | 5.89 | 13.65 | | 11.52 | |
| | | | | | | f | 58.44 | 6.00 | 13.48 | | 11.61 | |
| 5 | n-C$_3$H$_7$ | n-C$_3$H$_7$ | H | Cl(7) | 74–75 | c | 58.53 | 5.89 | 13.65 | | 11.52 | |
| | | | | | | f | 58.86 | 6.03 | 13.80 | | 11.55 | |
| 6 | n-C$_3$H$_7$ | n-C$_3$H$_7$ | H | Cl(8) | 105–106 | c | 58.53 | 5.89 | 13.65 | | 11.52 | |
| | | | | | | f | 58.72 | 5.79 | 13.74 | | 11.70 | |
| 7 | C$_2$H$_5$ | n-C$_4$H$_9$ | H | Cl(7) | 63–64 | c | 58.53 | 5.89 | 13.65 | | 11.52 | |
| | | | | | | f | 58.49 | 5.78 | 13.54 | | 11.26 | |
| 8 | n-C$_3$H$_7$ | n-C$_3$H$_7$ | H | F$_3$C(7) | 94–95 | c | 56.30 | 5.31 | 12.31 | | | 16.70 |
| | | | | | | f | 56.64 | 5.25 | 12.39 | | | 16.88 |
| 9 | n-C$_3$H$_7$ | n-C$_3$H$_7$ | H | F$_3$C(8) | 116–118 | c | 56.30 | 5.31 | 12.31 | | | 16.70 |
| | | | | | | f | 56.23 | 5.02 | 12.08 | | | 16.91 |
| 10 | n-C$_3$H$_7$ | n-C$_3$H$_7$ | H | NO$_2$(6) | 101–102 | c | 56.59 | 5.69 | 17.60 | | | |
| | | | | | | f | 56.54 | 5.64 | 17.50 | | | |
| 11 | n-C$_3$H$_7$ | CH$_2$CH$_2$—S—CH$_3$ | H | H | 69–71 | c | 58.99 | 6.27 | 13.75 | 10.50 | | |
| | | | | | | f | 59.25 | 6.42 | 13.78 | 10.49 | | |

$^a$ Number in parenthesis indicates ring position.
$^b$ c=calculated; f=found.

EXAMPLE 12

Preparation of 5,8-dichloro-3,6-dinitro-4-di-n-propylaminoquinoline

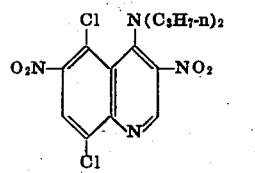

5.0 Grams of 5,8-dichloro-4-hydroxyquinoline [Prepared according to U.S. Pat. No. 2,555,943 (C.A. 45, 9568)] is added to a solution of nitric acid (50 ml.) and sulfuric acid (50 ml.) at 25°–45° C. The resulting The above compound is prepared following substantially the same procedure as in Example 12 except that 5,8-dichloro-4-hydroxyquinoline is replaced by 5,8-dibromo-4-hydroxyquinoline.

EXAMPLE 14

Pre-Emergence Herbicial Test

The pre-emergence herbicidal activity of the compounds of the invention is exemplified by the following tests in which the seeds of various monocotyledonous and dicotylendonous plants are separately mixed with potting soil and planted on top of approximately 1 inch of potting soil in separate pint cups. After planting, the cups are sprayed with the selected aqueous-acetone solution containing the test compound in sufficient quantity to provide the equivalent in pounds per acre of test compound per cup. The treated cups are then placed on greenhouse benches and cared for in the usual manner, in accordance with greenhouse procedures. Two weeks after treatment, the tests are terminated and each cup is examined and rated according to the defined Herbitoxicity Index given in the table below. The tabulated results of these tests are shown below in Table II, and establish the herbicidal proficiency of the test compounds.

HERBITOXICITY INDEX

9 = 100 percent reduction in stand
9⁻ = 1 or 2 stunted plants remaining
8 = 85 – 100 percent reduction in stand
7 = 70 – 85 percent reduction in stand
6 = 60 – 70 percent reduction in stand
5 = 50 – 60 percent reduction in stand
4 = 40 – 50 percent reduction in stand
3 = 30 – 40 percent reduction in stand
2 = 20 – 30 percent reduction in stand
1 = 10 – 20 percent reduction in stand
0 = no apparent effect
$a$ = abnormal, malformed, twisted
$g$ = unusual physiological effect
$m$ = moderate injury
$s$ = severe injury
$t$ = trace to slight injury
— = no test Abbreviations for the plant species employed in Examples 14 and 15 are as follows:

Ba = Barnyard Grass
Cor = Corn
Cot = Cotton
Cr = Crabgrass
GRF = Green Foxtail
La = Lambsquarters
Mi = Millet
Mu = Mustard
Pi = Pigweed
Ra = Radish
SB = Sugar beets
Soy = Soybeans
To = Tomatoes
WO = Wild Oats
WH = Wheat

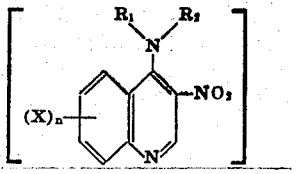

EXAMPLE 15

Post Emergence Herbicidal Test

The post emergence herbicidal activity of the compounds of the instant invention is demonstrated by treating various monocotyledonous and dicotyledonous plants with the compounds dispersed in aqueous-acetone mixtures. In the test, seedling plants are grown in jiffy flats for about 2 weeks. The test compounds are dispersed in 50/50 acetone/water mixtures in sufficient quantity to produce concentration of the desired pounds per acre of active compound when applied to the plants through a spray nozzle operating at 30 p.s.i. for a predetermined time. After spraying, the plants are placed on greenhouse benches and are cared for in the usual manner, commensurate with convention greenhouse practices. Two weeks are treatment, the seedling plants are examined and rated according to the Herbitoxicity Index provided in Example 14.

Results are shown in Table III below.

TABLE III.

POST EMERGENCE HERBICIDAL DATA

| Compound of Ex. No. | lb./acre | La | Mu | Pi | Ba | Cr | GRF | TO | WH |
|---|---|---|---|---|---|---|---|---|---|
| 1 | 10 | .9 | ma | 9 | m | 8a | ma | sa | 0 |
| 3 | 10 | 9 | 9⁻ | 9 | 3 | 7 | 3 | ta | 0 |

I claim:
1. A 4-alkylamino-3-nitroquinoline compound represented by the formula:

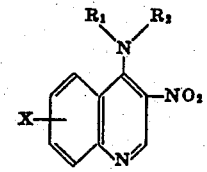

wherein:
$R_1$ and $R_2$ are hydrogen, lower alkyl $C_1$–$C_5$ or (lower alkylthio $C_1$–$C_2$) lower alkyl $C_1$–$C_2$ provided that when either $R_1$ or $R_2$ is hydrogen the other must be lower alkyl or (lower alkylthio) lower alkyl and,
X is hydrogen, halo, or trifluoromethyl.

2. A compound of claim 1 wherein $R_1$ and $R_2$ are each lower alkyl.

3. The compound according to claim 2:

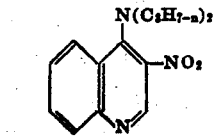

4. The compound according to claim 2:

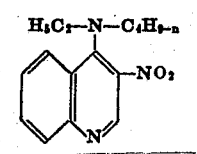

5. The compound according to claim 2:

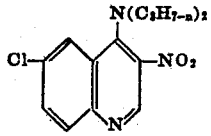

* * * * *

UNITED STATES PATENT OFFICE
CERTIFICATE OF CORRECTION

Patent No. 3,700,674                    Dated October 24, 1972

Inventor(s) Robert E. Diehl and Richard J. Magee

It is certified that error appears in the above-identified patent and that said Letters Patent are hereby corrected as shown below:

Column 7, above the words "Example 15" delete the formula and replace with Table II shown below:

TABLE II. PRE-EMERGENCE HERBICIDAL DATA

| Compound of Example Number | Lb./Acre | Pi | Ba | Cr | GRF | WO | Mi | Cor | Cot | Ra | SB | Soy | WH |
|---|---|---|---|---|---|---|---|---|---|---|---|---|---|
| 1 | 5 | 7ga | 8a | 9a | 9a | ta | - | - | - | - | - | - | - |
|   | 10 | 9 | 9a | 9 | 9a | 6a | - | - | - | 0 | - | - | - |
|   | 25 | - | - | - | - | - | 9 | - | - | 0 | - | - | - |
| 3 | 3 | tga | 7 | 3a | 7 | 0 | - | 0 | 0 | - | 0 | 0 | - |
|   | 9 | sga | 9ā | 8a | 9 | 0 | - | 0 | 0 | - | 0 | 0 | - |
| 4 | 5 | 5g | 8a | 9 | 9a | 0 | - | - | - | - | - | - | - |
|   | 15 | 5g | 9ā | 9 | 9 | 0 | - | - | - | - | - | - | - |
|   | 25 | - | - | - | - | - | 9a | - | - | 0 | - | - | 0 |
| 5 | 5 | 0 | mga | 4 | sga | 0 | - | - | - | - | - | - | - |
|   | 15 | 5g | 9a | 7 | 9 | 0 | - | - | - | - | - | - | - |
|   | 25 | - | - | - | - | - | 9a | - | - | 0 | - | - | 0 |
| 6 | 8 | 5 | 9⁻ | 3 | 0 | 0 | - | 0 | 0 | - | 0 | 0 | - |
|   | 25 | - | - | - | - | - | 9a | - | - | 0 | - | - | 0 |
| 7 | 4 | 3a | 9ā | 9ā | 0 | 0 | - | 0 | 0 | - | 0 | 0 | - |
|   | 25 | - | - | - | - | - | 9a | - | - | 0 | - | - | 0 |
| 8 | 25 | - | - | - | - | - | 9⁻ | - | - | - | - | - | - |

Signed and sealed this 13th day of March 1973.

(SEAL)
Attest:

EDWARD M. FLETCHER, JR.                    ROBERT GOTTSCHALK
Attesting Officer                           Commissioner of Patents